June 21, 1932.  H. A. KNOX  1,863,858

TRACK FOR TRACKLAYING VEHICLES

Original Filed Nov. 14, 1925

Inventor
Harry A. Knox
By W. N. Roach.
Attorney

Patented June 21, 1932

1,863,858

UNITED STATES PATENT OFFICE

HARRY A. KNOX, OF DAVENPORT, IOWA

TRACK FOR TRACKLAYING VEHICLES

Refile of application Serial No. 69,175, filed November 14, 1925. This application filed October 29, 1929.
Serial No. 403,301.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

The subject of this invention is a track for track-laying vehicles.

This application is a refile of abandoned application, Serial No. 69,175, filed November 14, 1925.

Because of the severe usage to which the tracks of track-laying vehicles are subjected, the elements of the track require frequent repair and renewal. The measure of a successful track does not consist solely of its mileage but includes also the facility of replacement of parts. A consideration of this second important factor entering into the design of a track has led to the present improvement wherein the form and arrangement of all of the elements of the track cooperate to produce the advantages desired.

The track is characterized by a strong, simple and light structure affording good traction and low unit ground pressure and consists of mutually spacing link members constituting a rail for the wheels of a vehicle and retained on a pin by means of shoes mounted on the extremities thereof.

To these and other ends, my invention consists in the construction, arrangement and combination of elements, described hereinafter and pointed out in the claims forming a part of this specification.

A practical embodiment of the invention is illustrated in the accompanying drawing, wherein.

Figure 1:
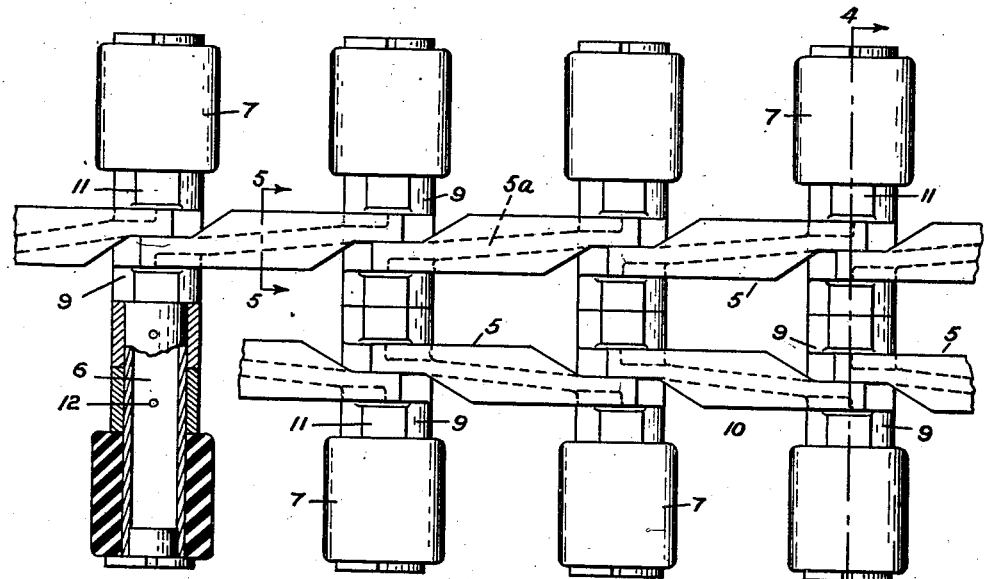
Fig. 1 is a plan view partly in section of a track constructed in accordance with the invention.
Figure 2:
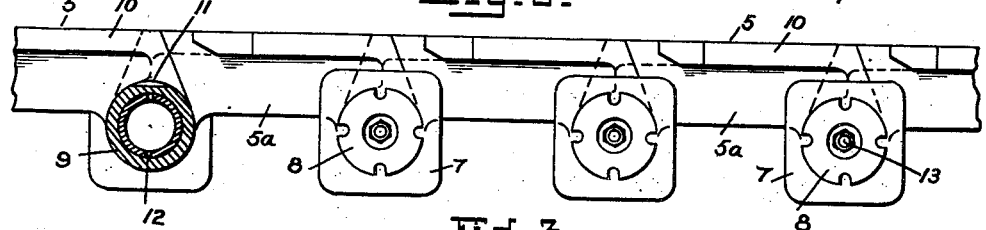
Fig. 2 is a view partly in side elevation and partly in longitudinal section of Fig. 1.

Referring to the drawing by numerals of reference:

The track is composed of similar sections, each comprising a pair of links 5—5, a link pin 6, and a pair of shoes 7—7, mounted on the extremities of the pin and retained by means of screw plugs 8 threaded in the link pin.

The bearings 9—9 on each end of the links extend oppositely with respect to the web 5a of the link which is oblique to the bearings so that when assembling in series the bearings may be all of the same width. The links are symmetrical and, consequently, may be reversed when unevenly worn, the offset bearings of associated links mutually spacing each other and positioning the shoes 7.

Each link is further formed with an overhanging portion 10 constituting a rail on which the truck rollers ride, the web 5a being of sufficient height so that the bearings 9 need only be slightly cut away as at 11 to provide clearance for the flange of the rollers.

The shoes 7 may be formed of any suitable material and may assume any suitable shape. They are loosely mounted so as to be capable of rotational movement in adjusting for wear.

The link pin which is hollow forms a convenient reservoir for a lubricant and is provided with small ducts 12 to permit lubrication of the bearings. The plugs 8 are equipped with a valve 13 for inserting the lubricant.

Figure 3:
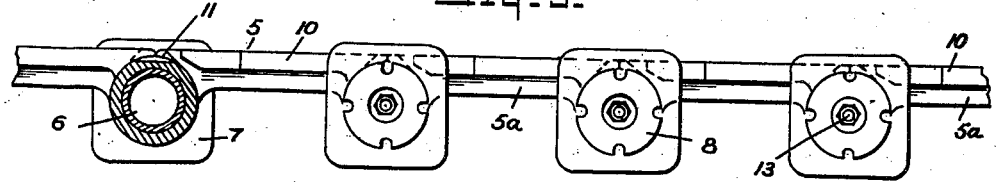
Fig. 3 is a view similar to Fig. 2 of a modified form of the invention.
Figures 4, 5:
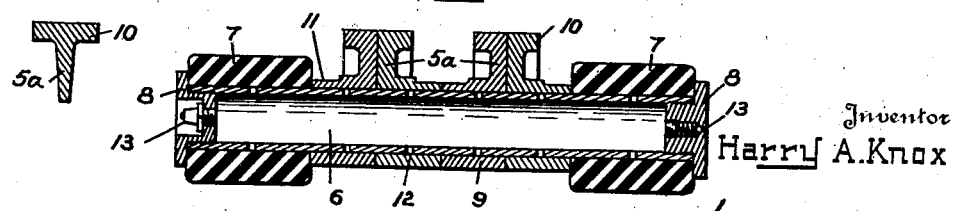
Fig. 4 is a sectional view on the line 4—4 of Fig. 1.
Fig. 5 is a sectional view on the line 5—5 of Fig. 1.

The modified form of the invention shown in Fig. 3 is particularly designed for light vehicles and differs only in the height of the web 5a of the link which is considerably reduced.

While the loose mounting of a shoe on each extremity of the link pin provides for the rapid and convenient replacement of the shoes, such a mounting bears an important relation to individually reversible and interchangeable track links by facilitating their assembly, rearrangement and disassembly. The mutual spacing of the track links and the retention of the links on the pin by means of the shoes produces a co-action of all the elements of the track which is a distinct advantage in a traction unit that is subjected to severe usage and, consequently, requires frequent repair. The lubrication of the three essential elements of the track, namely, the links, pin and shoes, in addition to its normal function of preventing wear, insures the easy removal and replacement of any part.

While in the foregoing there has been illustrated and described such combination and arrangement of elements, as constitute the preferred embodiment of the invention, it is, nevertheless, desired to emphasize the fact that interpretation of the invention should only be conclusive when made in the light of the subjoined claims.

I claim:

1. In a track for track-laying vehicles, link pins, pairs of symmetrical links connecting the pins, each link terminating in oppositely disposed offset bearings receiving the link pins, each pair of links arranged on the link pins with the offset bearings of their associate ends respectively directed inwardly and outwardly, the inwardly directed bearings serving to space the links and separate shoes positioned one on each extremity of the link pin by the outwardly directed bearings and serving to retain the links and means for retaining each shoe.

2. In a track for track-laying vehicles, link pins, pairs of symmetrical links connecting the pins, each link terminating in oppositely disposed offset bearings receiving the link pins, each pair of links arranged on the link pins with the offset bearings of one associate end directed inwardly and serving to space the links, and separate shoes positioned one on each extremity of the link pin and serving to retain the links and means for retaining each shoe.

3. A sectional track for vehicles embodying laterally spaced links, the ends of the links offset to form spacers, link pins connecting the links and separate shoes mounted one on each end of the pins.

4. A sectional track for vehicles embodying links, link pins and separate shoes mounted one on each extremity of the pins.

5. A sectional track for vehicles, embodying links, link pins and separate shoes rotatably mounted one on each extremity of the pins.

HARRY A. KNOX.